United States Patent
Kim et al.

(10) Patent No.: US 8,125,098 B2
(45) Date of Patent: Feb. 28, 2012

(54) WIND POWER GENERATION

(75) Inventors: Kwang Sik Kim, Seoul (KR); Young Eon Kim, Gwacheon-si (KR)

(73) Assignees: Kyung Sik Kim, Seoul (KR); Young Jin Kim, Seoul (KR); Masami Goto, Tokyo (JP)

( * ) Notice: Subject to any disclaimer, the term of this patent is extended or adjusted under 35 U.S.C. 154(b) by 405 days.

(21) Appl. No.: 12/519,105

(22) PCT Filed: Dec. 11, 2007

(86) PCT No.: PCT/KR2007/006422
§ 371 (c)(1),
(2), (4) Date: Jul. 8, 2009

(87) PCT Pub. No.: WO2008/082094
PCT Pub. Date: Jul. 10, 2008

(65) Prior Publication Data
US 2010/0032962 A1    Feb. 11, 2010

(30) Foreign Application Priority Data
Dec. 29, 2006   (KR) .................. 10-2006-0138550

(51) Int. Cl.
*F03D 9/00* (2006.01)
*F03B 15/06* (2006.01)
(52) U.S. Cl. .......................... 290/55; 290/44
(58) Field of Classification Search ............ 290/43, 290/44, 54, 55
See application file for complete search history.

(56) References Cited

U.S. PATENT DOCUMENTS

| | | | | |
|---|---|---|---|---|
| 4,039,848 A | * | 8/1977 | Winderl | 290/55 |
| 4,379,972 A | * | 4/1983 | Sosa et al. | 290/44 |
| 7,116,006 B2 | * | 10/2006 | McCoin | 290/54 |
| 7,230,348 B2 | * | 6/2007 | Poole | 290/55 |
| 7,256,512 B1 | * | 8/2007 | Marquiss | 290/55 |
| 8,026,626 B1 | * | 9/2011 | Meller | 290/55 |

FOREIGN PATENT DOCUMENTS

| | | |
|---|---|---|
| JP | 61-265361 A | 11/1986 |
| JP | 2000-220561 A | 8/2000 |
| KR | 20-0221659 Y1 | 4/2001 |
| KR | 20-0244751 | 9/2001 |

OTHER PUBLICATIONS

International Search Report mailed Mar. 13, 2008 for PCT/KR2007/006422.

* cited by examiner

*Primary Examiner* — Nicholas Ponomarenko
(74) *Attorney, Agent, or Firm* — The Law Office of Michael E. Kondoudis

(57) ABSTRACT

A wind power generator. The wind power generator includes a generator main body formed of fiberglass reinforced plastics (FRP). Built-in fans having blades are connected to four built-in fan motors to generate high pressure air to be ejected to the exterior so that an inductor including magnets is primarily and relatively rotated with respect to a rotor including a rotating shaft to induce electromotive force. In addition, high air (reproduced energy) discharged to the exterior from the built-in fans is acted on the propeller installed behind the rotor including the shaft to rotate the rotor in a reverse direction of the rotational direction of the generator main body, thereby maximizing electromotive force of energy.

10 Claims, 14 Drawing Sheets

WIND POWER GENERATION

CROSS-REFERENCE TO RELATED APPLICATION

The present invention is a national phase of international application no. PCT/KR2007/006422, filed 11 Dec. 2007, and claims the benefit of priority of Korean patent application no. 10-2006-0138550, filed 29 Dec. 2006, the contents of which are incorporated by reference.

TECHNICAL FIELD

The present invention relates to a wind power generator, and more particularly, to an improved wind power generator capable of generating wind in a generator itself to uniformly generate power, different from general wind power generation using natural wind, thereby remarkably increasing generation efficiency.

BACKGROUND ART

Generally, wind power generators are devices for rotating propellers using naturally blowing wind to generate electric power through magnets and rotors.

The conventional wind power generator, as shown in FIG. 13 disclosed in Korean Patent Registration No. 654246, entitled "Windmill for Wind Power Generator", includes a rotary shaft 100, and a propeller 110. The propeller 110 is axially coupled to the rotary shaft 100 to be rotated by winds blowing from a forward direction. Permanent magnets or electromagnets are installed at one side of the propeller 110, and a rotor formed of induction coils is installed at the rotary shaft 100 corresponding to the magnets, so that electric power is generated by induced electromotive force generated from induction coils of the rotor by a magnetic field generated by the magnets.

However, in the conventional wind power generator, since only the propeller is rotated by winds and the rotary shaft is in a fixed state such that rotational force and period by the propeller are already determined, it is difficult to improve generation efficiency. In addition, since the conventional wind power generator depends upon forwardly blowing winds only, generation efficiency may be decreased or no power may be generated when wind intensity is unstable and no wind blows, thereby making it difficult to constitute a power generation system.

[Technical Problem]

In order to solve the foregoing and/or other problems, it is an object of the present invention to provide a wind power generator capable of ejecting high pressure air to the exterior using four built-in fans disposed at an inductor in front of a propeller to provide a high efficiency wind power generation system in which the propeller as a horizontally rotated blade connected to a rotary shaft is rotated in a reverse direction of a rotational direction of the inductor due to recycled high air. A rotor of the rotary shaft is rapidly rotated with respect to an induction magnet of the inductor such that the sum of magnetic line of force by electromotive force to increase power generation quantity, thereby increasing alternate current frequency due to the generation to accomplish stable power generation. As a result, it is possible to provide a wind power generator having stable and excellent characteristics regardless of wind blowing places and environments.

[Technical Solution]

An improved wind power generator A in accordance with the present invention includes a propeller 23 supported by a rotary shaft 21 axially coupled to an outer main body 10 by a bearing 22 to be rotated by winds blowing from a forward direction, thereby generating electric power. The improved wind power generator A also includes an inductor 30 rotatably coupled to the rotary shaft 21 and installed in front of the propeller 23 to induce winds blowing from a forward direction to the propeller 23. A plurality of induction pipes 31 are formed at the inductor 30 to induce the wind blowing from the forward direction to rotate the propeller 23 and the inductor 30 in opposite directions.

In addition, the plurality of induction pipes 31 are formed at the inductor 30 at predetermined intervals, built-in fan cases 40 installed at positions corresponding to the induction pipes 31 are connected to the induction pipes 31 at their outer parts, and built-in fans 42 are installed in the built-in fan cases 40 to be rotated by built-in motors 41, thereby inducing the forward wind to the induction pipes 31. The built-in fans 42 may be formed in plural numbers, preferably, four fans. Each built-in fan 42 includes a plurality of blades 43. The blades 43 may be slant blades, vertical blades, or curved vertical blades.

In addition, induction magnets 32 are installed in the inductor 30, and a rotor 24 is integrally formed with the rotary shaft 21 to correspond to the induction magnets 32. Further, the outer main body 10 has a funnel shape with a large diameter at its front part and a small diameter at its rear part. A main body magnet 11 is installed at one side of the outer main body 10, and a main body-coupled rotor 25 is installed at the rotary shaft 21 to correspond to the main body magnet 11 to generate power.

Further, four built-in motors 41 for the built-in fans 42 are installed to receive electric power generated by the induction magnet 32 and the rotor 24. Preferably, two built-in motors 41 opposite to each other are parallelly connected to supply electric power, and the other two built-in motors 41 are serially connected to supply electric power.

While certain exemplary embodiments of the present invention have been shown and described, it will be appreciated by those skilled in the art that various changes may be made to these embodiments without departing from the spirit and scope of the invention as defined by the appended claims and their equivalents.

[Advantageous Effects]

As can be seen from the foregoing, high pressure air can be ejected to the exterior by four built-in fans installed in an inductor in front of a propeller using a high efficiency mechanism, and the propeller as a horizontal blade connected to a rotary shaft is rotated in a reverse direction of the rotational direction of the inductor to provide a high efficiency wind power generation system.

Therefore, it is possible to rapidly rotate the rotor of the rotary shaft with respect to the induction magnets of the inductor to increase the sum of magnetic lines of force by electromotive forces to generate large electric power, and increase alternate current power generation cycles to stably supply electric power, thereby providing a wind power generator having good characteristics regardless of wind-blowing places and environments.

DESCRIPTION OF DRAWINGS

The above and other objects, features and advantages of the present invention will be more apparent from the following detailed description taken in conjunction with the accompanying drawings, in which.

DESCRIPTION OF MAJOR REFERENCE NUMERALS

A: Wind power generator

| | |
|---|---|
| 10: Outer main body | 11: Main body Magnet |
| 21: Rotary Shaft | 23: Propeller |
| 24: Rotor | 25: Main body-coupled rotor |
| 30: Inductor | 31: Induction pipe |
| 32: Induction magnet | 41: Built-in motor |
| 42: Built-in fan | 43: Blade |

[Best Mode]

Hereinafter, the present invention will be described in detail with reference to the accompanying drawings.

Figure 1:
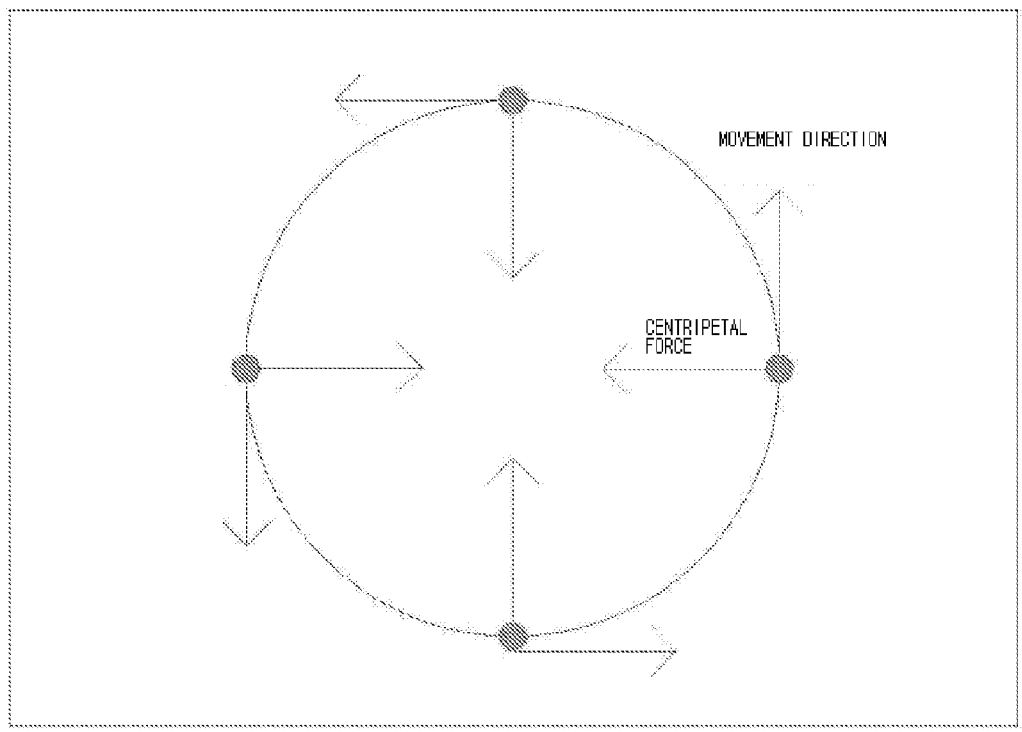
FIG. 1 is a view illustrating uniform circular motion of built-in fans of a wind power generator in accordance with the present invention.
Figure 2:
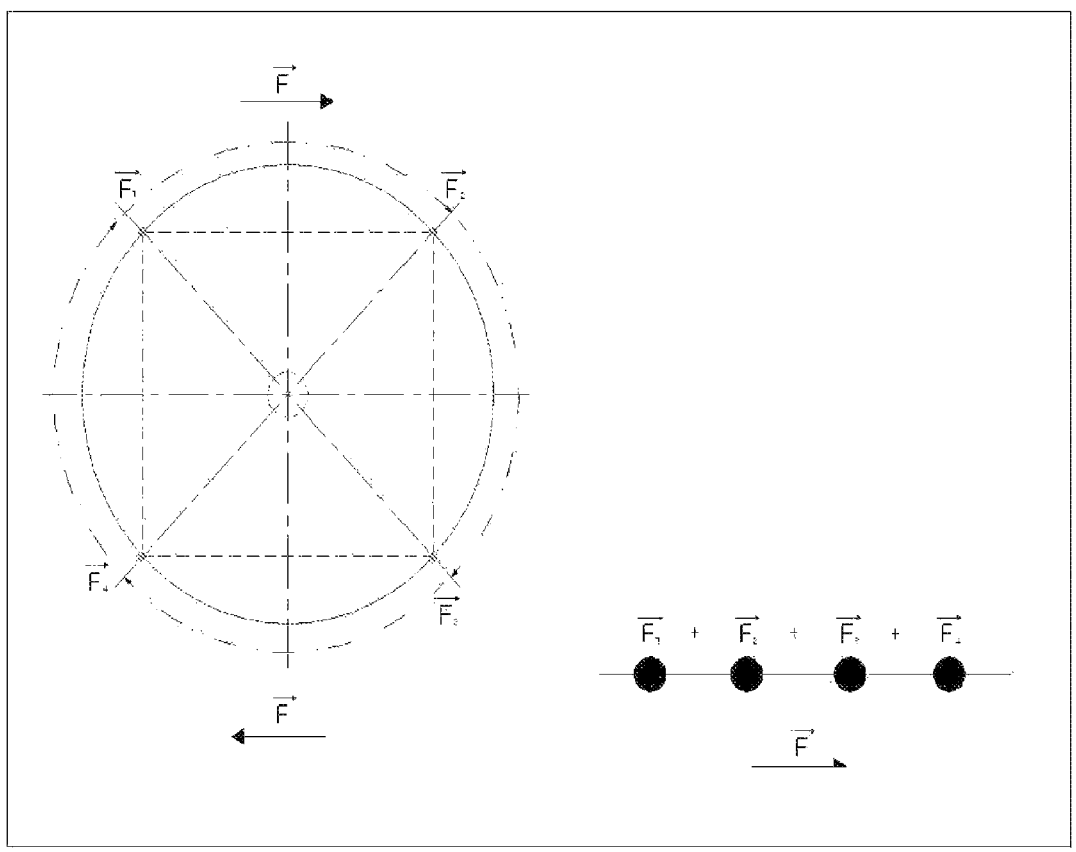
FIG. 2 is a view illustrating the composition of forces generated through uniform circular motion by four built-in fans of the wind power generator in accordance with the present invention.
Figure 3A:
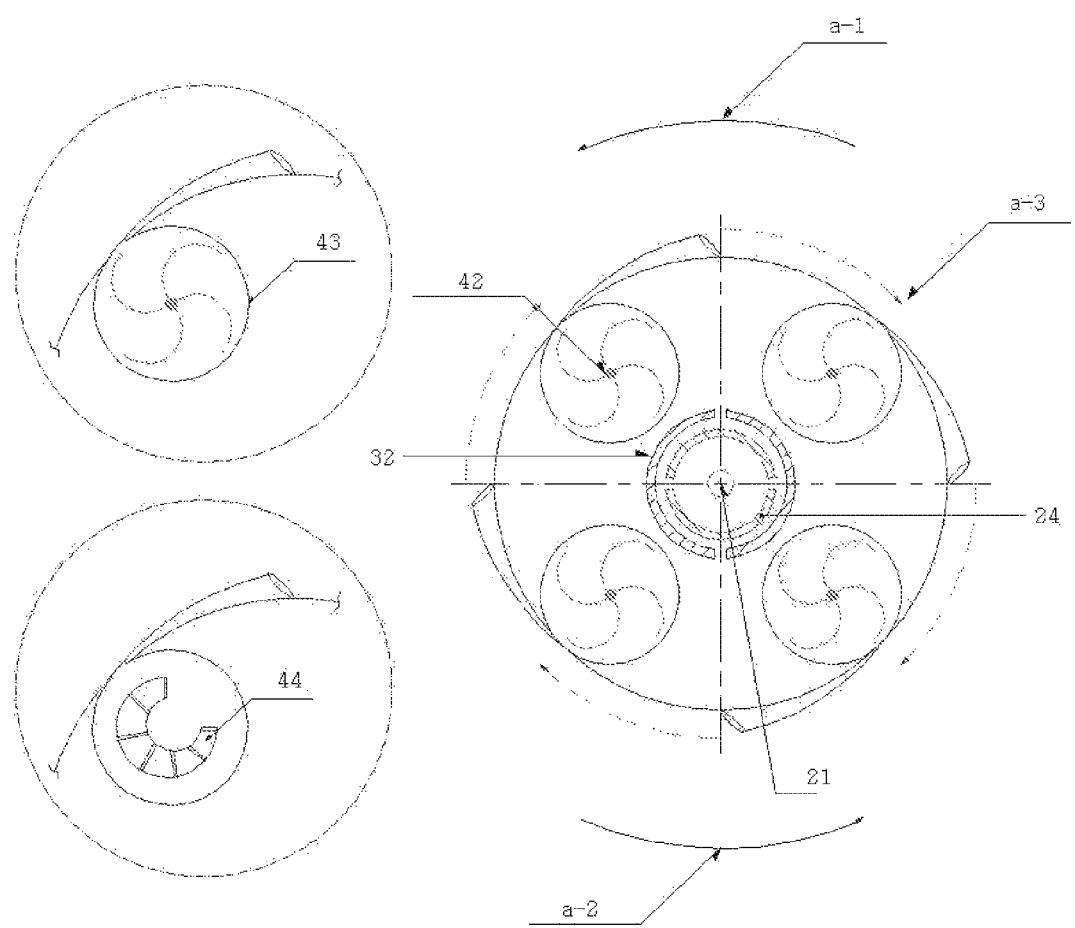
FIGS. 3A and 3B are front views of an inductor of the wind power generator in accordance with the present invention.
Figure 3B:
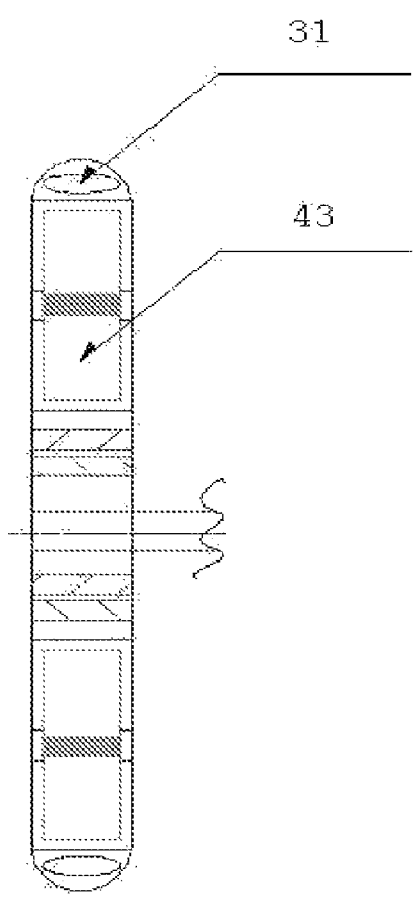
Figure 4A:
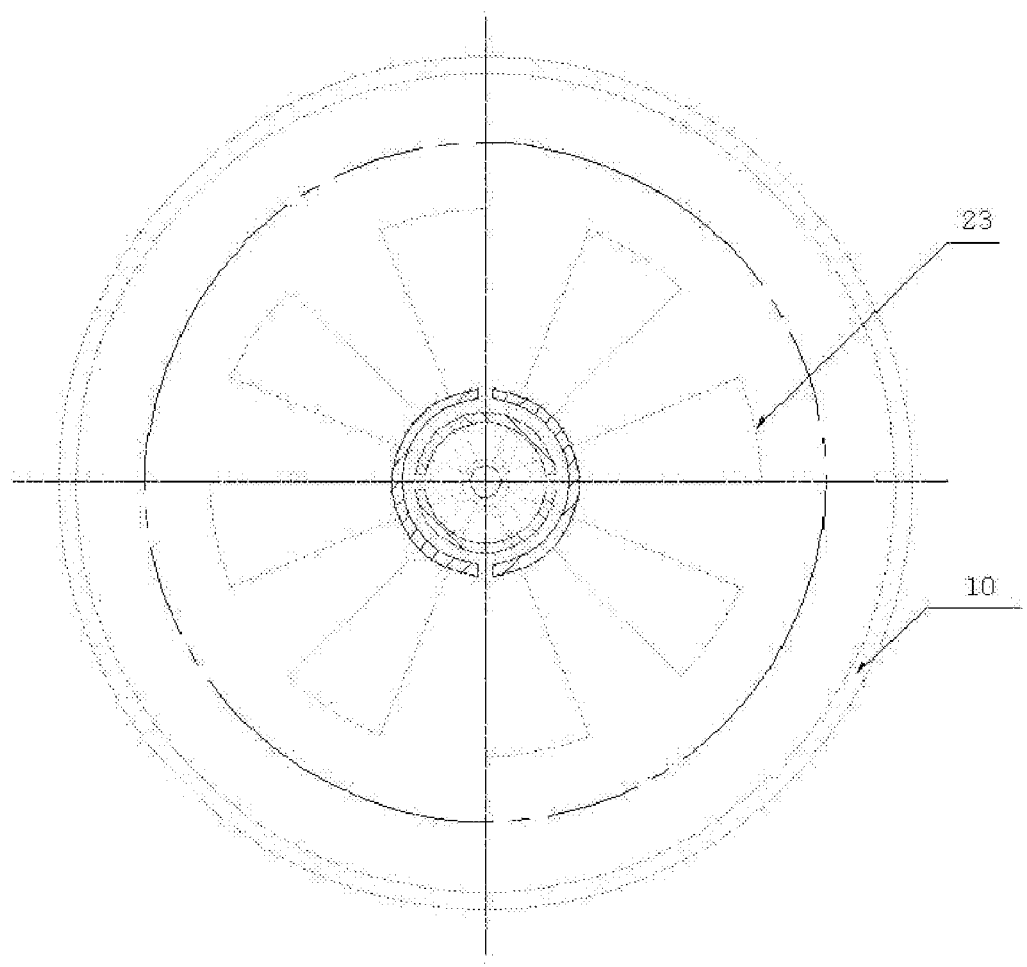
FIGS. 4A and 4B are front views of a propeller and an outer main body of the wind power generator in accordance with the present invention.
Figure 4B:
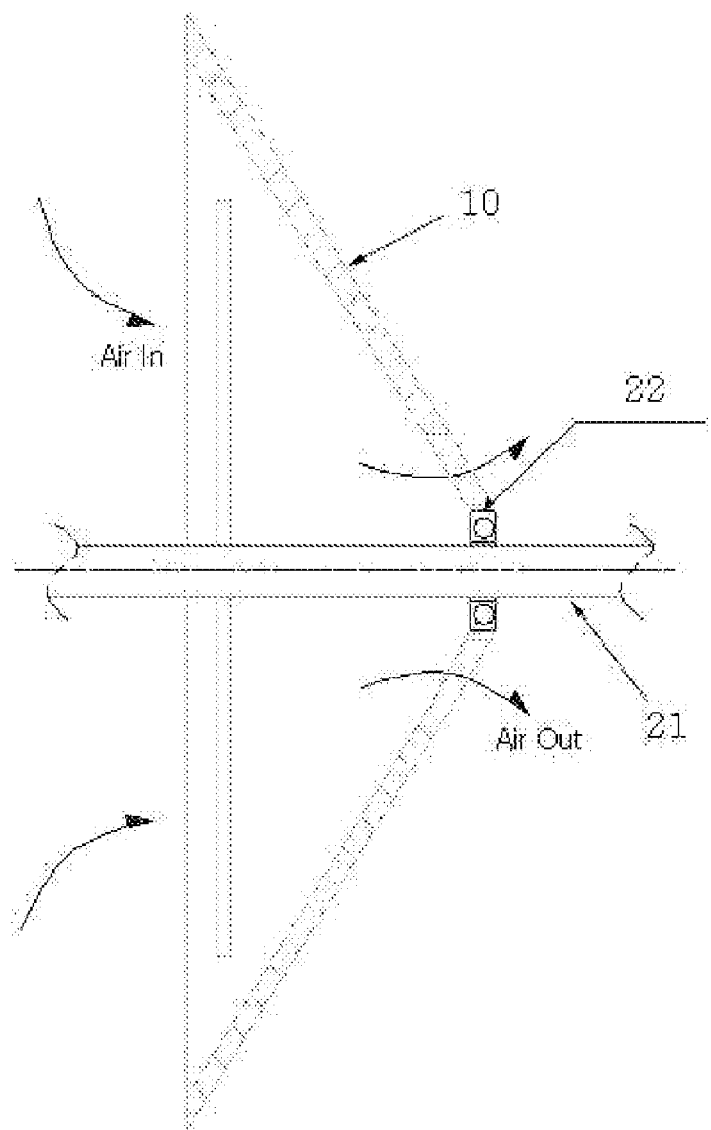
Figure 5:
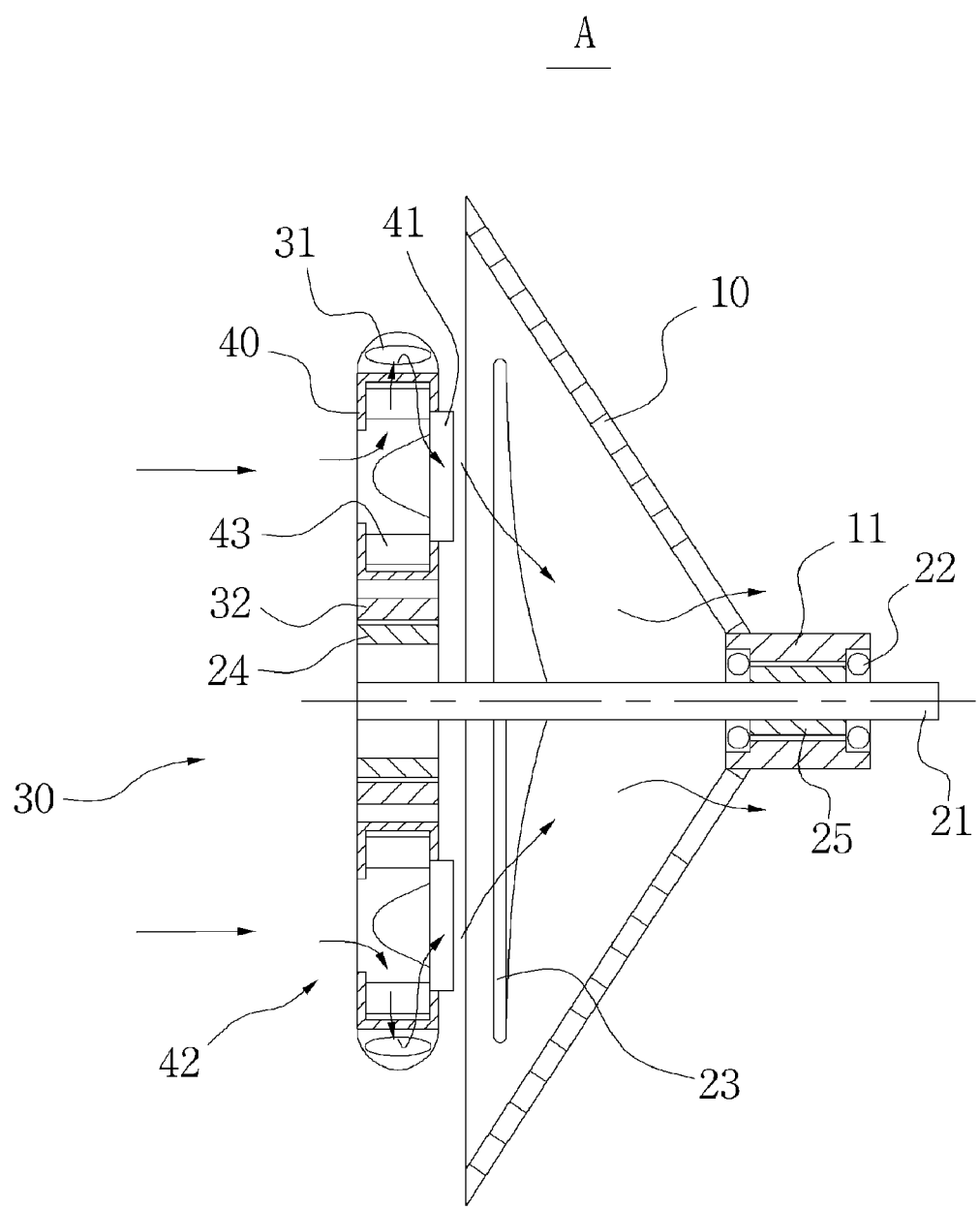
FIG. 5 is a side cross-sectional view of the wind power generator in accordance with the present invention.
Figure 6:
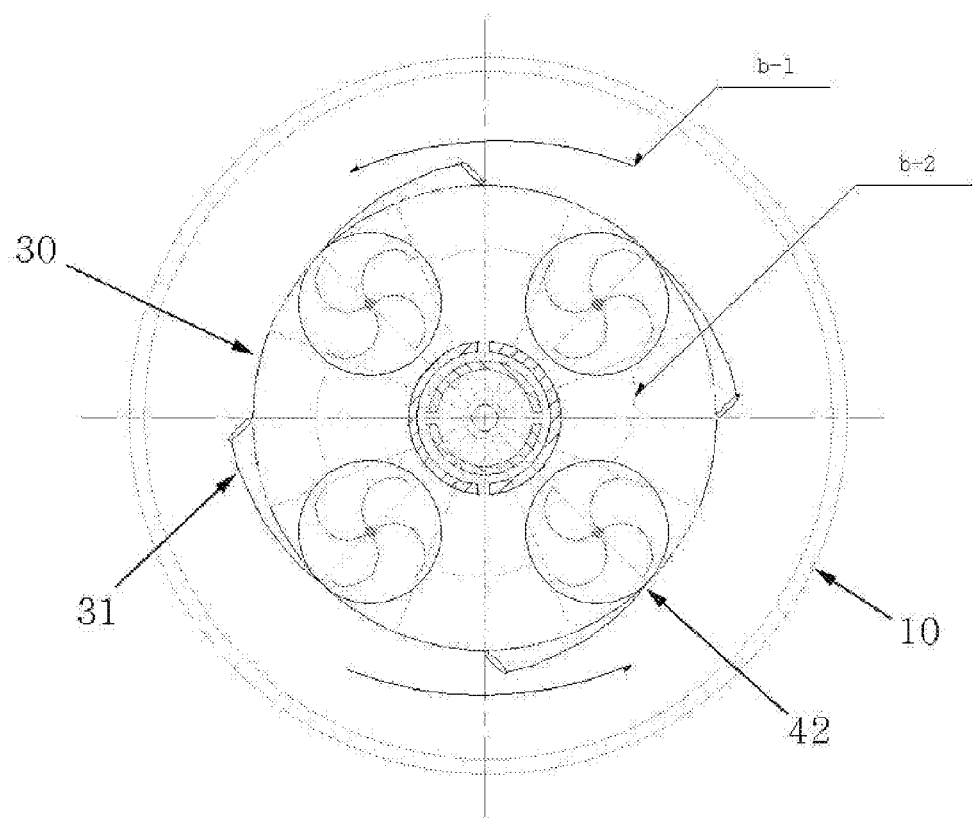
FIG. 6 is a front view of the wind power generator in accordance with the present invention.
Figure 7:
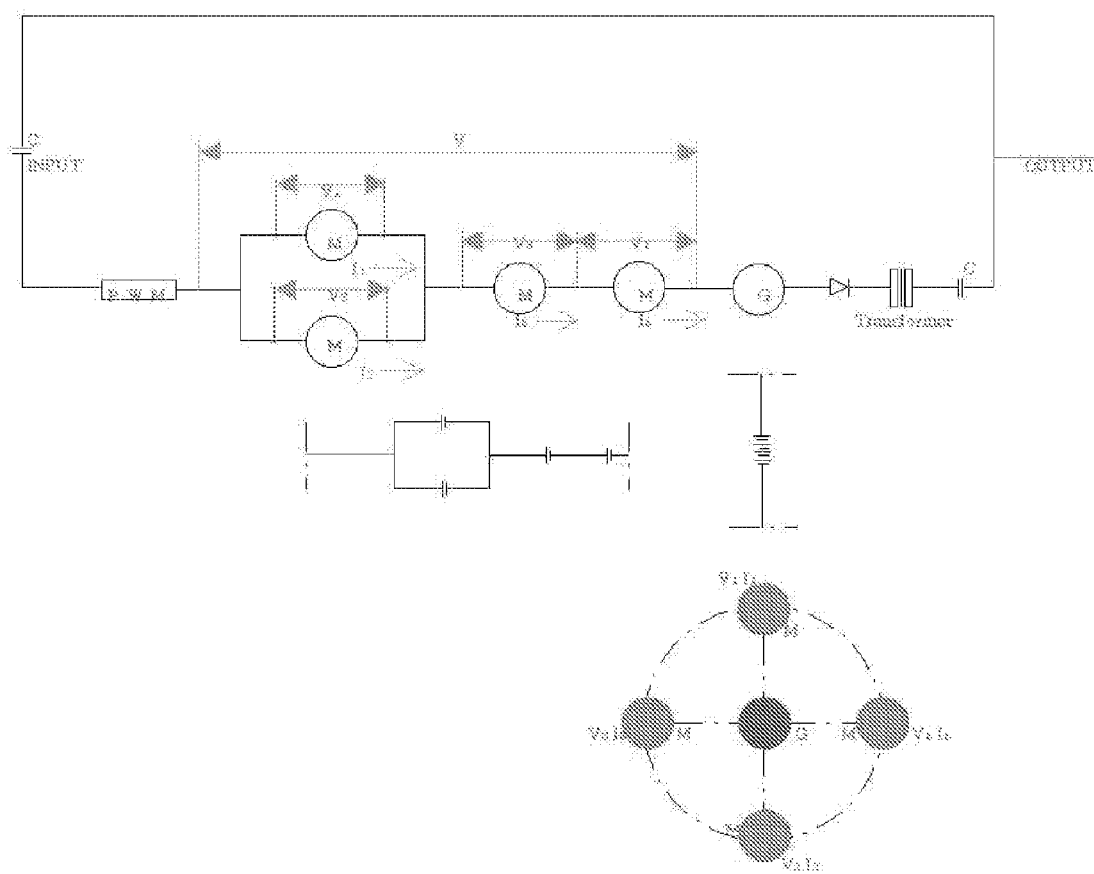
FIG. 7 is a circuit diagram including four built-in fans and a rotor of the wind power generator in accordance with the present invention.
Figure 8:
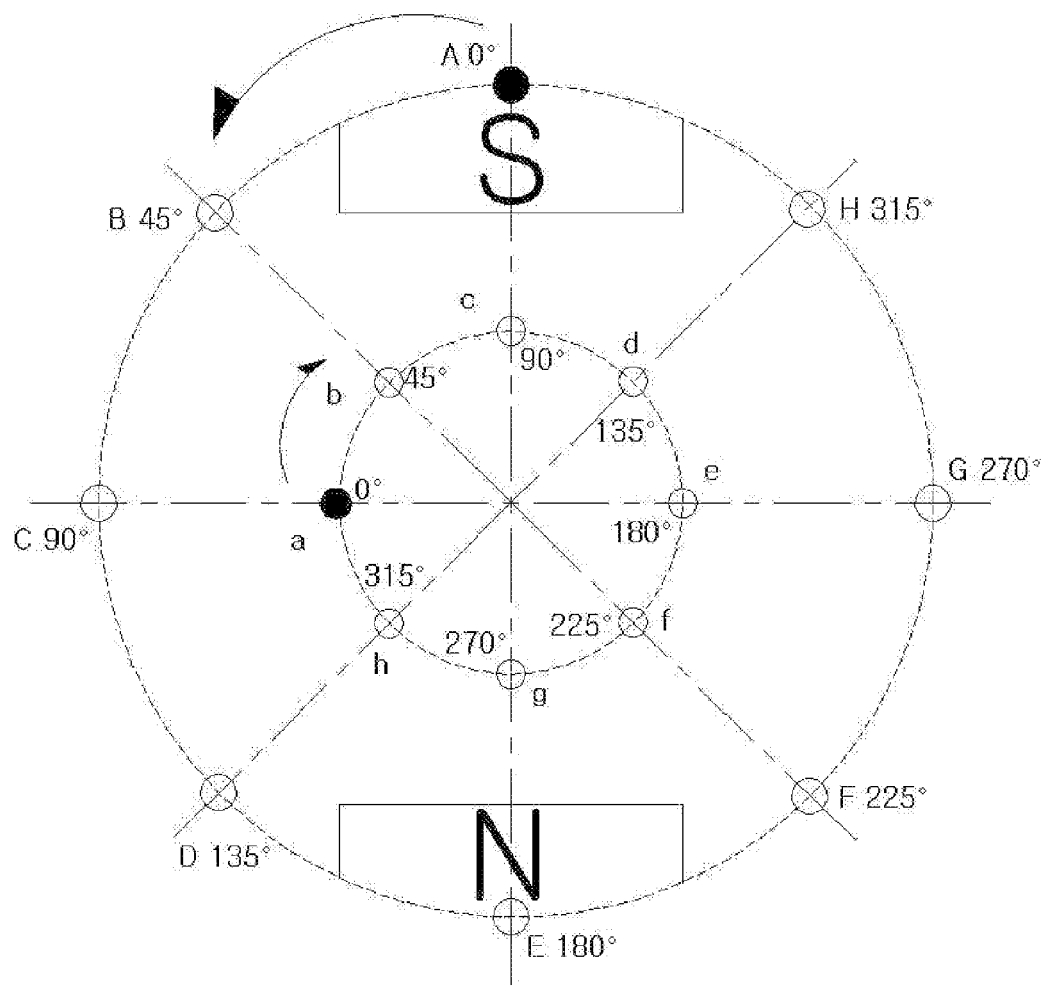
FIGS. 8 to 10 are views illustrating position variations of magnets depending on operation of the wind power generator in accordance with the present invention.
Figure 9:
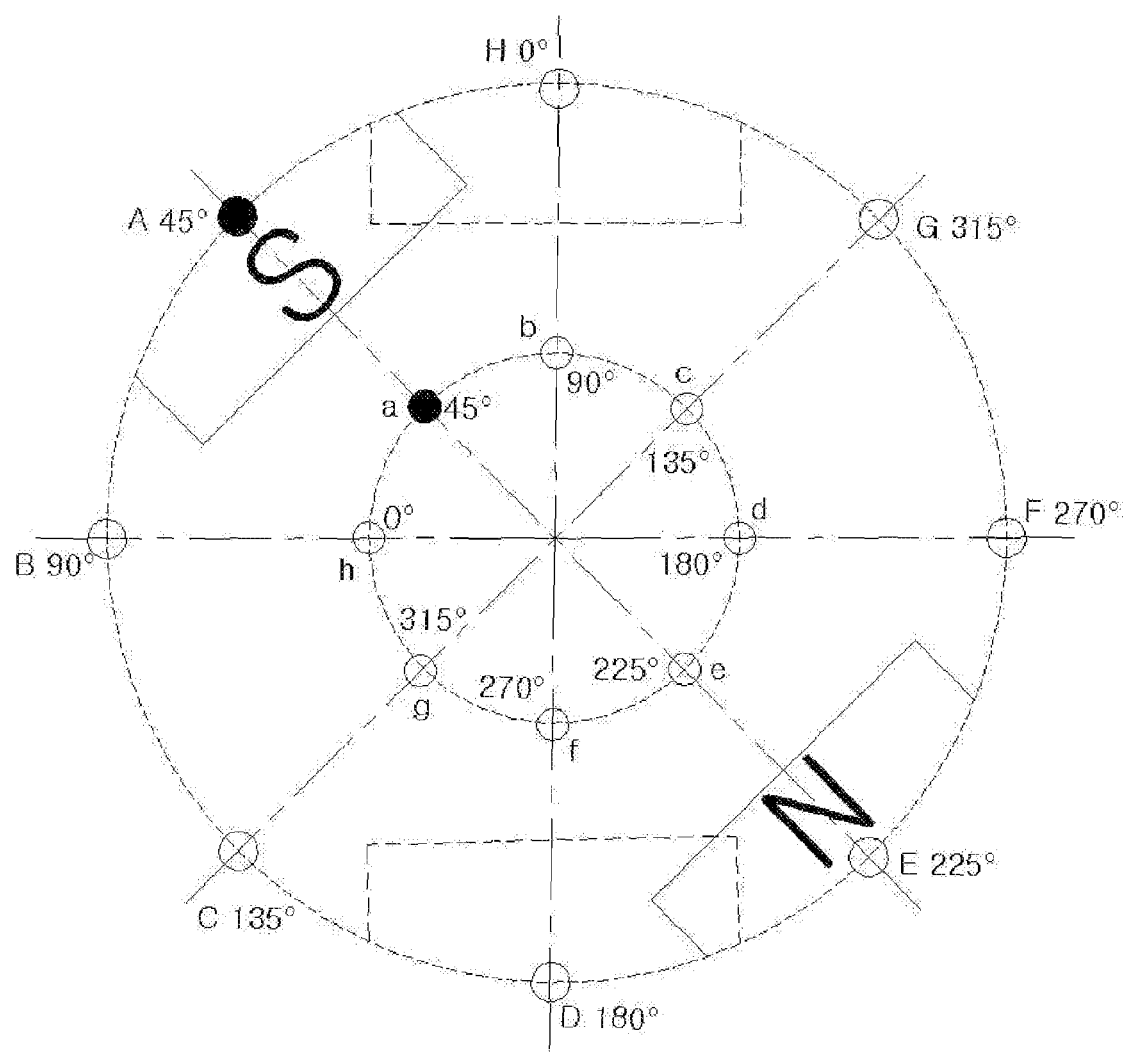
Figure 10:
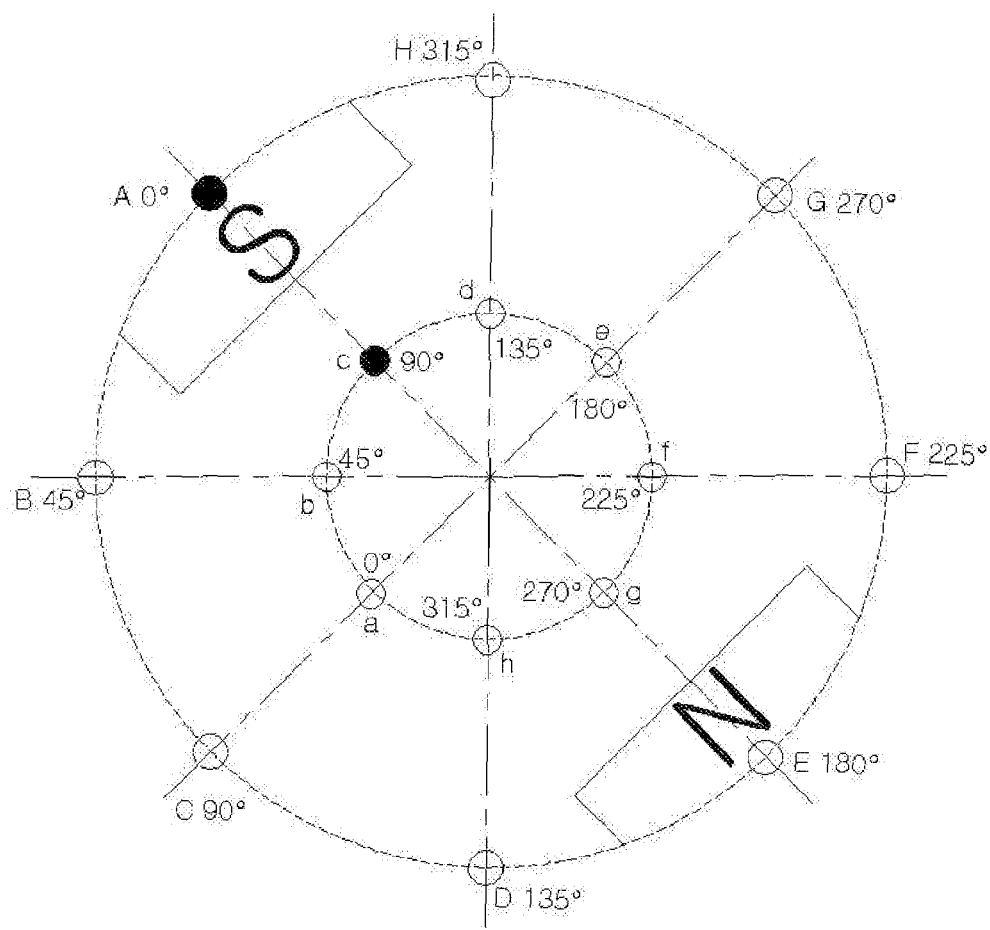
Figure 11:
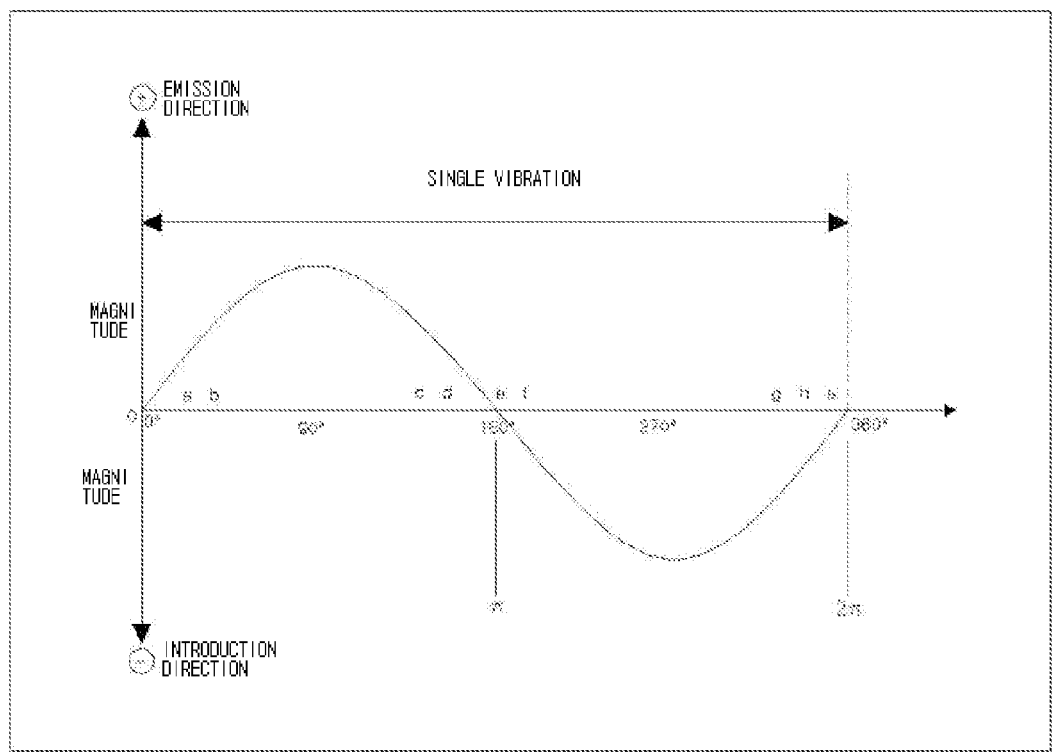
FIGS. 11 and 12 are graphs showing AC sine waves generated from the wind power generator in accordance with the present invention.
Figure 12:
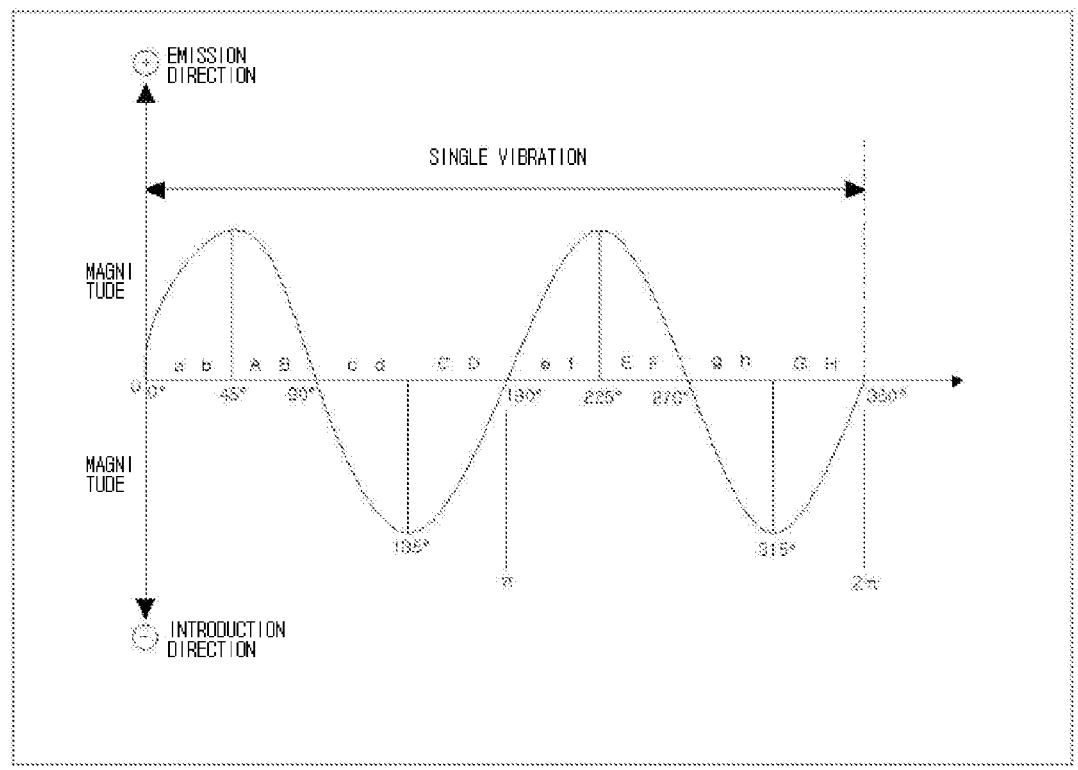
Figure 13:
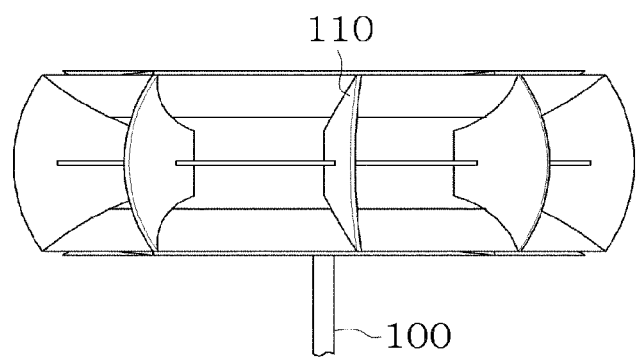
FIG. 13 is a front view of a conventional wind power generator.

FIG. 1 is a view illustrating uniform circular motion of built-in fans of a wind power generator in accordance with the present invention, FIG. 2 is a view illustrating the composition of forces generated through uniform circular motion by four built-in fans of the wind power generator in accordance with the present invention, FIGS. 3A and 3B are front views of an inductor of the wind power generator in accordance with the present invention, FIGS. 4A and 4B are front views of a propeller and an outer main body of the wind power generator in accordance with the present invention, FIG. 5 is a side cross-sectional view of the wind power generator in accordance with the present invention, FIG. 6 is a front view of the wind power generator in accordance with the present invention, FIG. 7 is a circuit diagram including four built-in fans and a rotor of the wind power generator in accordance with the present invention, FIGS. 8 to 10 are views illustrating position variations of magnets depending on operation of the wind power generator in accordance with the present invention, and FIGS. 11 and 12 are graphs showing AC sine waves generated from the wind power generator in accordance with the present invention.

As shown in FIGS. 1 to 12, an improved wind power generator A in accordance with the present invention includes a propeller 23 supported by a rotary shaft 21 axially coupled to an outer main body 10 by a bearing 22 to be rotated by winds blowing from a forward direction, thereby generating electric power. That is, the rotary shaft 21 axially coupled to the outer main body 10 fixed to the ground or a support is rotated to generate power. The propeller 23 may be formed of a plastic or metallic material, preferably, fiberglass reinforced plastics (FRP).

As shown in the drawings, an inductor 30 is rotatably coupled to the rotary shaft 21 and installed in front of the propeller 23 to induce winds blowing from a forward direction to the propeller 23. A plurality of induction pipes 31 are formed at the inductor 30 to induce the winds blowing from the forward direction to rotate the propeller 23 and the inductor 30 in opposite directions.

In addition, the plurality of induction pipes 31 are formed at the inductor 30 at predetermined intervals, built-in fan cases 40 installed at positions corresponding to the induction pipes 31 are connected to the induction pipes 31 at their outer parts, and built-in fans 42 are installed in the built-in fan cases 40 to be rotated by built-in motors 41, thereby inducing the forward wind to the induction pipes 31.

The built-in fans 42 may be formed of four fans. Each built-in fan 42 includes a plurality of blades 43. The blades 43 may be slant blades, vertical blades, or curved vertical blades. In addition, the blades 43 may be formed of a plastic or metallic material, preferably, fiberglass reinforced plastics (FRP).

The wind power generator A in accordance with the present invention includes induction magnets 32 installed in the inductor 30, and a rotor 24 integrally formed with the rotary shaft 21 to correspond to the induction magnets 32.

Four built-in motors 41 for the built-in fans 42 are installed to receive electric power generated by the induction magnet 32 and the rotor 24. Preferably, two built-in motors 41 opposite to each other are parallelly connected to supply electric power, and the other two built-in motors 41 are serially connected to supply electric power.

In addition, the outer main body 10 has a funnel shape with a large diameter at its front part and a small diameter at its rear part. A main body magnet 11 is installed at one side of the outer main body 10, and a main body-coupled rotor 25 is installed at the rotary shaft 21 to correspond to the main body magnet 11 to generate power. That is, electric power is generated by the induction magnets 32 of the inductor 30 and the rotor 24 of a front end of the rotary shaft 21, and the main body magnet 11 of the outer main body 10 and the main body-coupled rotor 25 of a rear end of the rotary shaft 21.

Further, four built-in motors 41 for the built-in fans 42 are installed to receive the electric power generated by the induction magnet 32 and the rotor 24. Preferably, two built-in motors 41 opposite to each other are parallelly connected to supply electric power, and the other two built-in motors 41 are serially connected to supply electric power.

Reviewing again the wind power generator in accordance with the present invention, a detailed description thereof will be as follows.

That is, the basic theory of the wind power generator in accordance with the present invention can be explained as uniform circular motion (=centrifugal force & centripetal force) of the fan shown in FIG. 1. The centrifugal force can be expressed as follows:

$$F = m \cdot v^2 / r$$

wherein F is centrifugal force, m is mass, v is velocity, and r is radius.

Therefore, a numerator of the right side is in proportion to the left side number. That is, when F is increased, m and v are also increased. However, a denominator of the right side is in reverse proportion to the left side number. That is, when F is increased, m and v are increased, but r is decreased.

In addition, as shown in FIG. 2, the four built-in fans 42 are rotated in the same direction to compose and decompose the force, which can be expressed as a formula.

When at least two forces are applied to a single body, the two forces may be composed as a single force equal to the sum of the two forces. Since the magnitude of the composed forces is equal to the sum of the two forces, the sum of the forces generated by circular motion in the same direction of the four built-in fans 21 shown in FIG. 2 is expressed as follows:

$$F=F1+F2+F3+F4.$$

As shown in FIGS. 3A and 3B, reviewing a front view (FIG. 3A) of the wind power generator A, since winds blown by the built-in fans 42 is pressed toward the induction pipes 31 of the inductor 30 and ejected to the exterior, the inductor 30 of the wind power generator A is rotated with respect to the outer main body 10 by reaction of the ejection. In particular, since the fans are plurally installed, the inductor can be rotated with a larger force composed as described above. While the present invention illustrates the four built-in fans 42 installed at the inductor 30, a single fan or a plurality of fans may be installed. In addition, when a single built-in fan is installed, a force is too small, and when too many built-in fans are installed, efficiency of rotary movement may be decreased due to weight of too many built-in fans in comparison with the size of the inductor 30 (in comparison with an area of a front surface thereof). Further, unavoidable space such as grooves for installing the built-in fans decreases space efficiency. Therefore, the number of the built-in fans may be three to five.

The improved wind power generator A in accordance with the present invention generally includes the propeller 23 as a blade for producing a rotational force using winds blowing from a forward direction, the rotary shaft 21, and the outer main body 10 rotatably and axially coupled to the rotary shaft 21 by the bearing 22, thereby improving power generation efficiency. In addition, the inductor 30 disposed in front of the outer main body 10 and the propeller 23 and axially coupled to the rotary shaft 21 includes the induction pipes 31 connected to the built-in fans 42 for sucking forward winds and one side of the built-in fan cases 40 by through-holes to induce and discharge the winds. Further, the rotor 24 corresponding to the induction magnets 32 installed inside the inductor 30 is installed at the rotary shaft 21.

First, FIGS. 3A and 3B are front and side views of the inductor 30 of the wind power generator A in accordance with the present invention. Reference numerals a-1 and a-2 designate rotational directions of the inductor in front of the generator during rotation. As shown in FIG. 3B, the induction pipes 31 of the inductor 30 function as nozzles to eject high pressure air generated from the four built-in fans 42 installed at the inductor 30 to the exterior. Reference numeral a-3 designates a direction of a high air force ejected from the induction pipes 31 of the inductor 30. In addition, reference numeral 42 designates the built-in fans, and reference numeral 43 designates blades of the built-in fans 42. The blades 43 of the built-in fans 42 may have a slant blade shape, a vertical blade shape, or a curved vertical blade shape to form an axial flow type, a centrifugal force type, or a diagonal flow type. A gap between the built-in case 42 and the blade 43 of the built-in fan 42 is in a range 0.1 mm to 0.5 mm, preferably 0.15 mm. Further, reference numeral 44 designates an external air introduction part shown in a cover part of a front surface of the built-in fan 42. Furthermore, reference numeral 32 of FIG. 3a designates magnets opposite to each other and installed inside the inductor 30 of the wind power generator A, reference numeral 24 designates the rotor formed of coils wound on a rotor shaft including the rotary shaft 21, reference numeral 21 designates the rotary shaft, and reference numeral 43 of FIG. 3B designates the vertical blades of the built-in fan 42.

FIG. 4A is a front view of the outer main body 10 and the propeller 23, and FIG. 4B is a side view of FIG. 4A. The propeller 23 is mounted in the rear of the rotary shaft 21. The propeller 23 may be an axial flow type, a centrifugal force type, a diagonal flow type, or the like, preferably, the diagonal flow type or the axial flow type having slant curved horizontal blades. In addition, reference numeral 10 designates the outer main body disposed behind the inductor 30 and installed outside the propeller 23. The outer main body 10 functions as a collector of reproduced high air for rotating the propeller 23 as a horizontal blade for gathering high pressure air induced, discharged and reproduced by the inductor 30 and rotated behind the inductor 30. Further, reference numeral 22 designates a bearing disposed between the rotary shaft 21 and the outer main body 10. Of course, the rotary shaft 21 is supported with respect to the outer main body 10 supporting one side of the wind power generator A by the bearing 22 depending on necessity, and other propellers 23 and the inductor 30 may be supported by the bearings installed at proper positions to smoothly rotate them.

FIG. 5 is a schematic cross-sectional view of the wind power generator A in accordance with the present invention, including the propeller 23 as a horizontal blade mounted in the rear of the rotary shaft 21 and the outer main body 10, the main body 10 as a reproduced high air collector, and the inductor 30 installed in the front thereof, and so on. That is, the rotary shaft 21 is rotatably supported by the bearing 22 with respect to the outer main body 10 for supporting the entire wind power generator A in accordance with the present invention. Therefore, the propeller 23 coupled to the rotary shaft 21 is rotated with the rotary shaft 21 by winds so that electric power induced by a magnetic field of the main body magnet 11 integrally coupled to a rear part of the outer main body 10 is generated by the main body-coupled rotor 25 coupled to the rotary shaft 21 to generate electric power. In addition, the rotor 24, on which coils are wound, is formed at a front end of the rotary shaft 21, electric power is generated from the rotor 24 by a magnetic force of the induction magnets 32 inside the inductor 30 rotatably coupled to the rotary shaft 21. That is, it is natural that the bearing (not shown) is installed to stably rotate the inductor 30 with respect to the rotary shaft 21.

As a result, air blowing from the forward direction is changed into high pressure air at the built-in fans 42 by electric energy supplied to the built-in motors 41 of the four built-in fans 42 installed at the inductor 30 in front of the outer main body 10 through serial/parallel circuit coupling, and is ejected to the exterior through nozzles of the induction pipes 31 to rotate the propeller 23. In particular, when the built-in fans 42 of the inductor 30 suck air in front thereof to generate high pressure air, a low pressure is instantly generated at a front part of the inductor 30 to introduce air around a front part of the wind power generator A such that the winds passed through the built-in fans 42 of the inductor 30 become a high pressure air to be blown to the propeller 23. In addition, since the outer main body 10 has a funnel shape for collecting air thereinto, the high pressure air supplied from the inductor 30 can be readily blown behind the outer main body 10 through the propeller 23.

FIG. 6 is a front view of FIG. 5. Reference numeral b-1 designates a rotational direction of the inductor 30 depending on ejection of the high pressure air of the four built-in fans 42 installed at the inductor 30 of the wind power generator A to the exterior. Reference numeral b-2 designates a rotational direction of the propeller 23 as a horizontal blade mounted on the rotary shaft 21 behind the inductor 30 to be rotated in a reverse direction of the rotational direction of the inductor 30. That is, since the winds compressed by the built-in fans 42 of the inductor 30 are ejected clockwise of FIG. 6 (a-3 direction of FIG. 3A), the inductor 30 is rotated counterclockwise of FIG. 6 (b-1). As a result, since the compressed wind rotates the propeller 23 and is rotated clockwise to be ejected backward, the propeller 23 is also rotated clockwise b-2 with the compressed wind.

FIG. 7 is a circuit diagram of an electric device part for improving efficiency, illustrating constitution of the wind power generator to stably supply power to the built-in motors. Serial and parallel electric circuits are installed at the system of the wind power generator A to supply electric power to the four built-in fans 42. That is, the built-in motors 41 of the two diagonally disposed built-in fans 42 are connected in parallel, and the built-in motors 41 of the other two diagonally disposed built-in fans 42 are connected in serial to minimize energy consumption. That is, current I=I1+I2=I3=I4, and V=V1(V1=V2)+V3+V4, so that the built-in motors 41 can be stably operated with respect to current supply and load resistance.

In addition, in the control system, the rotary shaft 21 can be smoothly rotated with respect to the outer main body 10 of the wind power generator A by external ejection of high pressure air through the built-in fans 42, and the propeller 23 as a horizontal blade mounted on the rotary shaft in a concentric manner is stably rotated in a reverse direction of the rotary shaft 21 to generate electric energy, thereby simultaneously supplying electricity to the four built-in motors 41. The control system is a peripheral device installed outside the wind power generator A, which includes a transformer, a condenser, PWM, an inverter, and so on.

FIGS. 8 to 10 are views illustrating circular motion and rotational angles of both polarities of the magnet and the coil during generation of alternate current. Reviewing a general alternate current generation method, when a conductive line in a uniform magnetic field performs uniform angular circular motion (a rotational angle each second is uniform) to be rotated 45°, the conductive line cuts a magnetic line of force with a substantially high ratio. When the conductive line arrives at a 90° position by rotating 45° more, an electromotive force arrives at its peak point. When the conductive line passes through the 90° position, the electromotive force is gradually reduced to arrive at zero upon rotation to 180° (since the conductive line moves parallel to the magnetic line of force, there is no cut of the magnetic line of force). After passing through the 180° position, the electromotive force is increased again to arrive at a maximum point upon rotation to a 270° position like the 90° position. After passing a 315° position and arriving at a 0° position, the electromotive force is reduced to zero. While the electromotive force is generated in an emission direction (+direction) from 0° to 180° (Fleming's right-hand rule), the electromotive force is generated in an introduction direction (−direction) from 180° to 0°.

As described above, conductive lines of the magnets and coils are continuously rotated with respect to each other with a uniform speed to obtain electric waves of induced electromotive forces by magnetic fields. Such alternate currents are referred to as sine wave alternate currents, which are typical and basic alternate currents.

FIGS. 9 and 10 illustrate power generation of the wind power generator A in accordance with the present invention through the sum of magnetic lines of force by rotational angles and an electromotive force of the induction magnets 32 of the inductor 30 and the rotor 24 of the rotary shaft 21. That is, when high pressure air from the built-in fans 42 is ejected to the exterior as shown in FIG. 3 to rotate the inductor to 45°, the propeller as a horizontal blade mounted on the rotary shaft 21 of FIG. 4 is rotated in a reverse direction by high air ejected to the exterior from the inductor 30. That is, the rotor 24 of the rotary shaft 21 is rotated in a reverse direction of the induction magnets 32 of the inductor 30 so that the sum of the magnetic lines of force by electromotive forces on a 45° line is disposed on a 90° line. As shown in FIGS. 8, 9 and 10, the inductor 30 and the rotary shaft 21 are rotated in opposite directions to maximize the sum of magnetic lines of force by electromotive force on the 45° line. In addition, when the rotational angle of the inductor 30 and the rotary shaft 21 passes through a 45° position, the electromotive force is gradually reduced to zero upon rotation to 90° (since the conductive line moves parallel to the magnetic line of force, there is no cut of the magnetic line of force). After passing through the 90° position, the electromotive force is increased again to arrive at a maximum point upon rotation to a 135° position like the 45° position. After passing through the 135° position, the electromotive force is gradually reduced to zero upon rotation to a 180° position. After passing through the 180° position, the electromotive force is increased again to arrive at a maximum point upon rotation to a 225° position. After passing through the 225° position, the electromotive force is gradually reduced to zero upon rotation to a 270° position. After passing through the 270° position, the electromotive force is increased again to arrive at a maximum point upon rotation to a 315° position. After passing through the 315° position, the electromotive force is gradually reduced to zero upon rotation to a 0° position. While the electromotive force is generated in an emission direction (+direction) from a relative rotation angle 0° to 90° (Fleming's right-hand rule), the electromotive force is generated in an introduction direction (−direction) from a relative rotation angle 90° to 180°. Repeatedly, while the electromotive force is generated in an emission direction (+direction) from a relative rotation angle 180° to 270°, the electromotive force is generated in an introduction direction (−direction) from a relative rotation angle 270° to 360°. It will be appreciated that the sum of the magnetic lines of force by electromotive forces is maximized on a rotational angle 45° line of the rotary body 30 and the rotary shaft 21 in opposite directions.

FIGS. 11 and 12 are graphs showing new electric waves of AC sine waves generated from a high efficiency wind power generator in accordance with the present invention.

A sine wave by one vibration in an alternate current generation method is generated in an emission direction (+direction) from 0° to a 180° position, and in an introduction direction (−direction) from 180° to 360° position.

While a sine wave of a general power generation method have one +direction and −direction each vibration as shown in FIG. 11, and the wind power generator A in accordance with the present invention have two +directions and −directions each vibration as shown in FIG. 12. That is, since both polarities of the magnet and the induction coil of the rotor are rotated in opposite directions so that one revolution of the inductor 30 causes two cycles of a waveform of a sine wave alternate current, the sum of the magnetic lines of force by electromotive forces is maximized on a relative rotation angle line. When the relative rotation is continuously performed, new sine wave alternate current having the sum of magnetic lines of force by electromotive forces can be continuously obtained. That is, the magnitude of the induced electromotive force of the rotor with respect to the magnetic field by the induction magnets is in proportion to rotational speed of the coil. In addition, since the two cycles of alternate current signals are generated upon a single rotation of the inductor, it is possible to obtain current stability and perform high efficiency power generation.

As can be seen from the foregoing, high pressure air can be ejected to the exterior by the four built-in fans installed in the inductor in front of the propeller using a high efficiency mechanism, and the propeller as a horizontal blade connected to the rotary shaft is rotated in a reverse direction of the rotational direction of the inductor to provide a high efficiency wind power generation system. Therefore, it is possible to rapidly rotate the rotor of the rotary shaft with respect to the induction magnets of the inductor to increase the sum of magnetic lines of force by electromotive forces to generate large electric power, and increase alternate current power generation cycles to stably supply electric power, thereby providing a wind power generator having good characteristics regardless of wind-blowing places and environments.

[Mode for Invention]

It is an object of the present invention to provide a wind power generator capable of ejecting high pressure air to the exterior using four built-in fans disposed at an inductor in front of a propeller to provide a high efficiency wind power generation system in which the propeller as a horizontally rotated blade connected to a rotary shaft is rotated in a reverse direction of a rotational direction of the inductor due to recycled high air. A rotor of the rotary shaft is rapidly rotated with respect to an induction magnet of the inductor such that the sum of magnetic line of force by electromotive force to increase power generation quantity, thereby increasing alternate current frequency due to the generation to accomplish stable power generation. As a result, it is possible to provide a wind power generator having stable and excellent characteristics regardless of wind blowing places and environments.

Industrial Applicability

High pressure air can be ejected to the exterior by four built-in fans installed in an inductor in front of a propeller using a high efficiency mechanism, and the propeller as a horizontal blade connected to a rotary shaft is rotated in a reverse direction of the rotational direction of the inductor to provide a high efficiency wind power generation system.

Therefore, it is possible to rapidly rotate the rotor of the rotary shaft with respect to the induction magnets of the inductor to increase the sum of magnetic lines of force by electromotive forces to generate large electric power, and increase alternate current power generation cycles to stably supply electric power, thereby providing a wind power generator having good characteristics regardless of wind-blowing places and environments.

What is claimed is:

1. An improved wind power generator comprising a propeller (23) supported by a rotary shaft (21) axially coupled to an outer main body (10) by a bearing (22) to be rotated by winds blowing from a forward direction, thereby generating electric power, which comprises: an inductor (30) rotatably coupled to the rotary shaft (21) and installed in front of the propeller (23) to induce winds blowing from a forward direction to the propeller (23); and an induction pipe (31) formed at the inductor (30) to induce the winds blowing from the forward direction to rotate the propeller (23) and the inductor (30) in opposite directions.

2. The improved wind power generator according to claim 1, wherein a plurality of induction pipes (31) are formed at the inductor (30) at predetermined intervals, built-in fan cases (40) installed at positions corresponding to the induction pipes (31) are connected to the induction pipes (31) at their outer parts, and built-in fans (42) are installed in the built-in fan cases (40) to be rotated by built-in motors (41), thereby inducing the forward wind to the induction pipes (31).

3. The improved wind power generator according to claim 2, wherein the built-in fans (42) are formed of four fans, each built-in fan (42) comprises a plurality of blades (43), and the blades (43) are slant blades, vertical blades, or curved vertical blades.

4. The improved wind power generator according to claim 1, wherein induction magnets (32) are installed in the inductor (30) and a rotor (24) is integrally formed with the rotary shaft (21) to correspond to the induction magnets (32).

5. The improved wind power generator according to claim 1, wherein the outer main body (10) has a funnel shape with a large diameter at its front part and a small diameter at its rear part, and a main body magnet (11) is installed at one side of the outer main body (10) and a main body-coupled rotor (25) is installed at the rotary shaft (21) to correspond to the main body magnet (11) to generate power.

6. The improved wind power generator according to claim 1, wherein our built-in motors (41) for the built-in fans (42) are installed to receive electric power generated by the induction magnet (32) and the rotor (24), and the two built-in motors (41) opposite to each other are parallelly connected to supply electric power, and the other two built-in motors (41) are serially connected to supply electric power.

7. The improved wind power generator according to claim 2, wherein four built-in motors (41) for the built-in fans (42) are installed to receive electric power generated by the induction magnet (32) and the rotor (24), and
 the two built-in motors (41) opposite to each other are parallelly connected to supply electric power, and the other two built-in motors (41) are serially connected to supply electric power.

8. The improved wind power generator according to claim 3, wherein four built-in motors (41) for the built-in fans (42) are installed to receive electric power generated by the induction magnet (32) and the rotor (24), and
 the two built-in motors (41) opposite to each other are parallelly connected to supply electric power, and the other two built-in motors (41) are serially connected to supply electric power.

9. The improved wind power generator according to claim 4, wherein four built-in motors (41) for the built-in fans (42) are installed to receive electric power generated by the induction magnet (32) and the rotor (24), and
 the two built-in motors (41) opposite to each other are parallelly connected to supply electric power, and the other two built-in motors (41) are serially connected to supply electric power.

10. The improved wind power generator according to claim 5, wherein four built-in motors (41) for the built-in fans (42) are installed to receive electric power generated by the induction magnet (32) and the rotor (24), and
 the two built-in motors (41) opposite to each other are parallelly connected to supply electric power, and the other two built-in motors (41) are serially connected to supply electric power.

\* \* \* \* \*